Feb. 6, 1923.
J. T. CAPPELL.
Traffic Signal.
Filed Aug. 22, 1921.
1,443,945
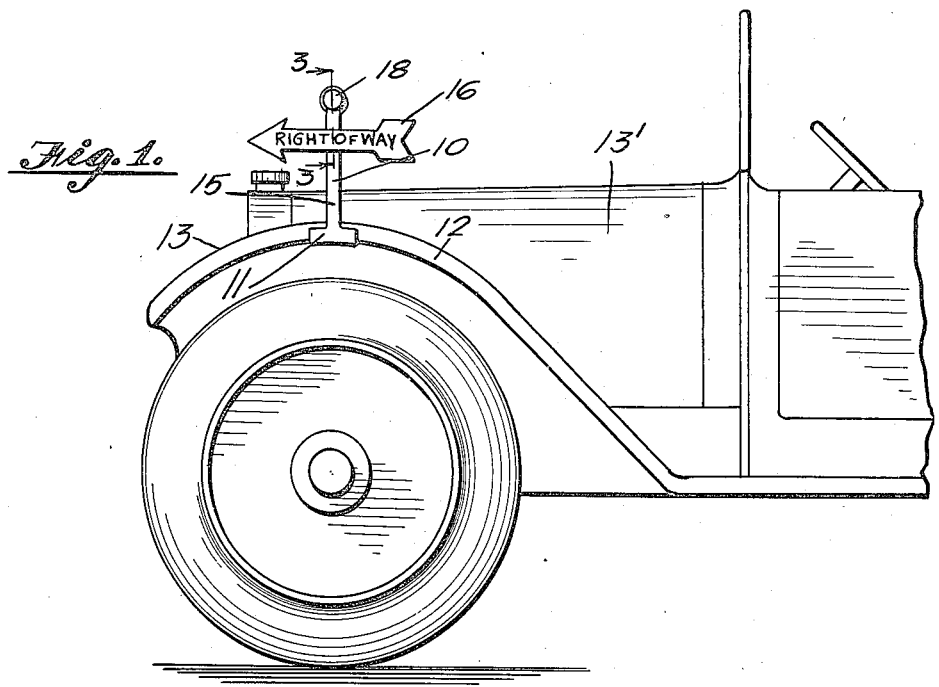
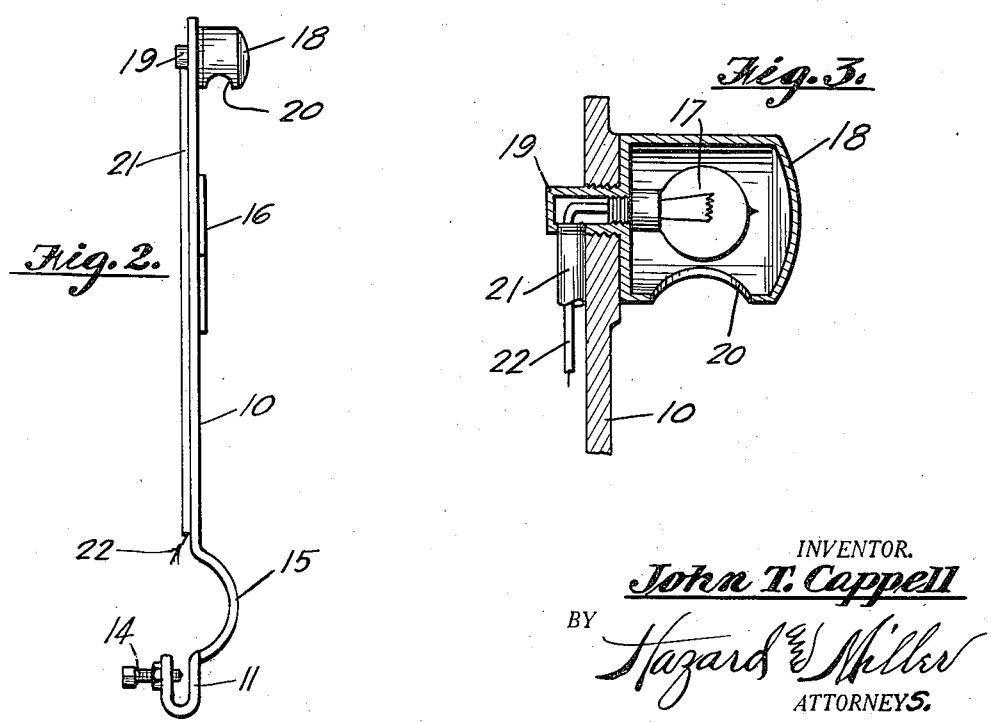
INVENTOR.
John T. Cappell
BY Hazard & Miller
ATTORNEYS.

Patented Feb. 6, 1923.

1,443,945

UNITED STATES PATENT OFFICE.

JOHN T. CAPPELL, OF LOS ANGELES, CALIFORNIA, ASSIGNOR OF ONE-HALF TO JAMES H. SLAUGHTER, OF LOS ANGELES, CALIFORNIA.

TRAFFIC SIGNAL.

Application filed August 22, 1921. Serial No. 494,037.

*To all whom it may concern:*

Be it known that I, JOHN T. CAPPELL, a citizen of the United States, residing at Los Angeles, in the county of Los Angeles and State of California, have invented new and useful Improvements in Traffic Signals, of which the following is a specification.

This invention relates to traffic signals and more particularly to a device carried by a vehicle for indicating that the same has the right of way and it is the object of this invention to provide means whereby one of two vehicles approaching a street intersection will show that it has the right of way.

It is customary in certain localities that when two vehicles approach a street intersection that the one on the driver's right has the right of way and to avoid any confusion I place on the left hand side of each vehicle a signal that is continuously shown and the driver on the left will be aware of the fact that he has not the right of way.

The invention will be readily understood from the following description of the accompanying drawings in which:

Fig. 1 is a side elevational view of an automobile with the device carried on the left front fender.

Fig. 2 is an enlarged end elevation.

Fig. 3 is an enlarged detailed section on the line 3—3 of Fig. 1.

The indicator comprises a vertical support 10 having an elongated U-shaped clamping member 11 adapted to be received around the flange portion 12 of a fender 13 mounted upon the vehicle 13'. A bolt 14 may be passed through the inner portion of the clamping member to secure it to the fender. The vertical support 10 has an outwardly bowed portion 15 to pass around the bead of the fender. A signal device in the form of an arrow 16 is fastened to the support intermediate of its ends and means for illuminating a signal at night time is positioned on the support and above the signal. Such means comprises a lamp 17 suitably held in a casing 18 which has a rearwardly extending portion 19 suitably secured to the supporting member 10. A hole 20 is provided in the lower portion of the casing 18 so that the rays of light will only be reflected downwardly and outwardly upon the signal. A conduit 21 passes down the inner side of the support to carry the necessary electric wires 22. The operation of the device is obvious from the foregoing description.

Various changes may be made without departing from the spirit of my invention.

What I claim is:

1. A traffic signal adapted to be mounted upon the left front fender of an automobile and comprising a vertical support, and an arrow mounted horizontally upon the support and having thereon the words "Right of way."

2. In combination, a vehicle and means for indicating the right of way to a person at the side of the vehicle comprising a signal immovably sustained on the vehicle and having indicia thereon.

3. A traffic signal adapted to be immovably mounted at the left side of a motor vehicle and comprising a support, and a right of way indicating member mounted on the support so as to be parallel to the forward direction of movement of the vehicle, said member having indicia thereon for indicating the right of way.

4. A traffic signal adapted to be mounted at the left side of a motor vehicle and comprising a support, a right of way indicating member secured to the support and adapted to be disposed parallel to the direction of travel of the vehicle, said member having indicia thereon, a lamp mounted on the support above the member, and a casing associated with the lamp for directing the rays therefrom onto said member to render the indica thereon visible at night.

In testimony whereof I have signed my name to this specification.

JOHN T. CAPPELL.